United States Patent
Nakayama

(10) Patent No.: US 11,305,439 B2
(45) Date of Patent: Apr. 19, 2022

(54) ROBOT WIRING ADDITIONAL ROUTING METHOD AND ROBOT

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 17/117,491

(22) Filed: Dec. 10, 2020

(65) Prior Publication Data

US 2021/0086375 A1 Mar. 25, 2021

Related U.S. Application Data

(63) Continuation of application No. 16/268,602, filed on Feb. 6, 2019, now Pat. No. 10,894,328.

(30) Foreign Application Priority Data

Mar. 29, 2018 (JP) .............................. JP2018-063647

(51) Int. Cl.
*B25J 9/12* (2006.01)
*B25J 19/00* (2006.01)
*H02G 3/04* (2006.01)

(52) U.S. Cl.
CPC ............. *B25J 19/0029* (2013.01); *B25J 9/12* (2013.01); *H02G 3/0456* (2013.01)

(58) Field of Classification Search
CPC ................................ B25J 19/0029; B25J 9/12
USPC ....................................................... 74/490.02
See application file for complete search history.

(56) References Cited

U.S. PATENT DOCUMENTS

| 9,806,457 | B2* | 10/2017 | Watanabe ............... H01R 13/60 |
| 10,456,908 | B2* | 10/2019 | Bordegnoni ............... B25J 9/08 |
| 2004/0261563 | A1* | 12/2004 | Inoue ................... B25J 19/0025 |
| | | | 74/490.03 |
| 2006/0101936 | A1 | 5/2006 | Inoue et al. |
| 2006/0101937 | A1 | 5/2006 | Salomonsson et al. |
| 2010/0089638 | A1 | 4/2010 | Shinoda et al. |

(Continued)

FOREIGN PATENT DOCUMENTS

| EP | 1 625 920 A1 | 2/2006 |
| JP | S51-049827 U | 4/1976 |

(Continued)

OTHER PUBLICATIONS

Office Action dated Mar. 24, 2020, in corresponding Japanese Application No. 2018-063647; 11 pages.

(Continued)

*Primary Examiner* — Randell J Krug
(74) *Attorney, Agent, or Firm* — Maier & Maier, PLLC

(57) ABSTRACT

A robot wiring additional routing method that includes detaching some fasteners to detach a cover member from a housing member, thus forming a gap between the detached cover member and the housing member; disposing additional wiring at such a position as to be routed across an inside and an outside of the housing member via the formed gap; and, in a state in which a spacer that maintains the gap is sandwiched between the cover member and the housing member, attaching the detached cover member to the housing member by the detached fasteners or other fasteners.

10 Claims, 9 Drawing Sheets

(56) References Cited

U.S. PATENT DOCUMENTS

2014/0137685 A1    5/2014   Iwayama
2015/0246449 A1    9/2015   Sakai et al.
2016/0297081 A1   10/2016   Watanabe et al.

FOREIGN PATENT DOCUMENTS

| | | |
|---|---|---|
| JP | H02-095592 A | 4/1990 |
| JP | H05-138581 A | 6/1993 |
| JP | H06-011990 U | 2/1994 |
| JP | H08-064973 A | 3/1996 |
| JP | 2005-046985 A | 2/2005 |
| JP | 2005-129573 A | 5/2005 |
| JP | 2006-51581 A | 2/2006 |
| JP | 2012-20368 A | 2/2012 |
| JP | 2014-100743 A | 6/2014 |
| JP | 2015-160305 A | 9/2015 |
| JP | 2016-198849 A | 12/2016 |
| WO | 2009/013798 A1 | 1/2009 |

OTHER PUBLICATIONS

Search Report dated Mar. 18, 2020, in corresponding Japanese Application No. 2018-063647; 25 pages.

\* cited by examiner

ROBOT WIRING ADDITIONAL ROUTING METHOD AND ROBOT

CROSS-REFERENCE TO RELATED APPLICATIONS

This application is a continuation of U.S. patent application Ser. No. 16/268,602, filed on Feb. 6, 2019, which is based on and claims priority to Japanese Patent Application No. 2018-063647, the contents of which are incorporated herein by reference.

FIELD

The present invention relates to a robot wiring additional routing method and a robot.

BACKGROUND

In the related art, wiring, such as a cable, used for driving a motor of each shaft of a robot is routed by using a space inside a mechanism of the robot (for example, see Japanese Unexamined Patent Application, Publication No. 2012-20368). On the other hand, wiring for a device to be additionally attached to the robot, such as a peripheral device to be installed on the distal end of an arm, is generally routed along an outer surface of the robot (for example, see Japanese Unexamined Patent Application, Publication No. 2014-100743).

SUMMARY

According to one aspect, the present invention provides a robot wiring additional routing method in which additional wiring is additionally routed for a robot that is provided with: a plurality of housing members that are coupled so as to be relatively movable; a cover member that is detachably attached to at least one of the housing members by means of fasteners; and existing wiring that is routed via a communication space communicating with internal spaces of the housing members, the method including: detaching some of the fasteners to detach the cover member from the corresponding housing member, thus forming a gap between the detached cover member and the housing member; disposing the additional wiring at such a position as to be routed across an inside and an outside of the housing member, via the formed gap; and attaching the detached cover member to the housing member by means of the detached fasteners or other fasteners, in a state in which a spacer that maintains the gap is sandwiched between the cover member and the housing member.

The above-described aspect may further include: disposing an elastic member that surrounds an outer circumference of the additional wiring at the position of the gap; and fixing the additional wiring at the position of the gap by sandwiching and elastically deforming the elastic member between the cover member and the housing member, when the detached cover member is attached to the housing member.

In the above-described aspect, the fasteners may be bolts; and the other fasteners may be bolts longer than the detached fasteners.

In the above-described aspect, the additional wiring may be disposed along the same route as the existing wiring.

In the above-described aspect, the additional wiring may be fixed so as to be adjacent to and parallel to the existing wiring, at fixing sites where the existing wiring is fixed to the respective housing members.

In the above-described aspect, the additional wiring may be fixed to two of the fixing sites that are both ends of a movable section of the existing wiring, so as to have a length equal to or longer than the maximum length of the existing wiring between the fixing sites. In a movable section of the existing wiring, the length of the corresponding section of each wiring disposed between the two fixing sites, which are located at both ends of the movable section, is set to a length including an extra length such that an excessive load is not imposed on the wiring through the operation of the robot.

In the above-described aspect, the spacer may be formed into a flat plate shape to be sandwiched between the housing member and the cover member and may be provided with a notch that forms, between the housing member and the cover member, the gap through which the additional wiring can be made to pass in a state in which the spacer is sandwiched between the housing member and the cover member.

In the above-described aspect, the cover member may be a wiring plate through which the existing wiring penetrates; the spacer may be formed into a C-shape in which a circumferential part thereof is cut off, with the notch; and the notch may have such a space size as to allow the existing wiring to pass therethrough.

According to another aspect, the present invention provides a robot including: a plurality of housing members that are coupled so as to be relatively movable; a cover member that is detachably attached to at least one of the housing members by means of fasteners; existing wiring that is routed via a communication space communicating with internal spaces of the housing members; and a spacer that forms a gap that allows, in a state in which the spacer is sandwiched between the at least one housing member and the cover member, additional wiring to be disposed between the housing member and the cover member.

In the above-described aspect, the spacer may be disposed between each of two different housing members of the plurality of housing members and the cover member.

DETAILED DESCRIPTION

A robot wiring additional routing method for a robot 1 according to one embodiment of the present invention will be described below with reference to the drawings.

The robot wiring additional routing method of this embodiment is a method for routing an additional cable 3 etc. (additional wiring) that is to be connected to a device 2, e.g., a camera, externally attached to a vertical articulated robot (hereinafter, referred to as robot) 1 shown in FIG. 1, for example.

Figure 2:
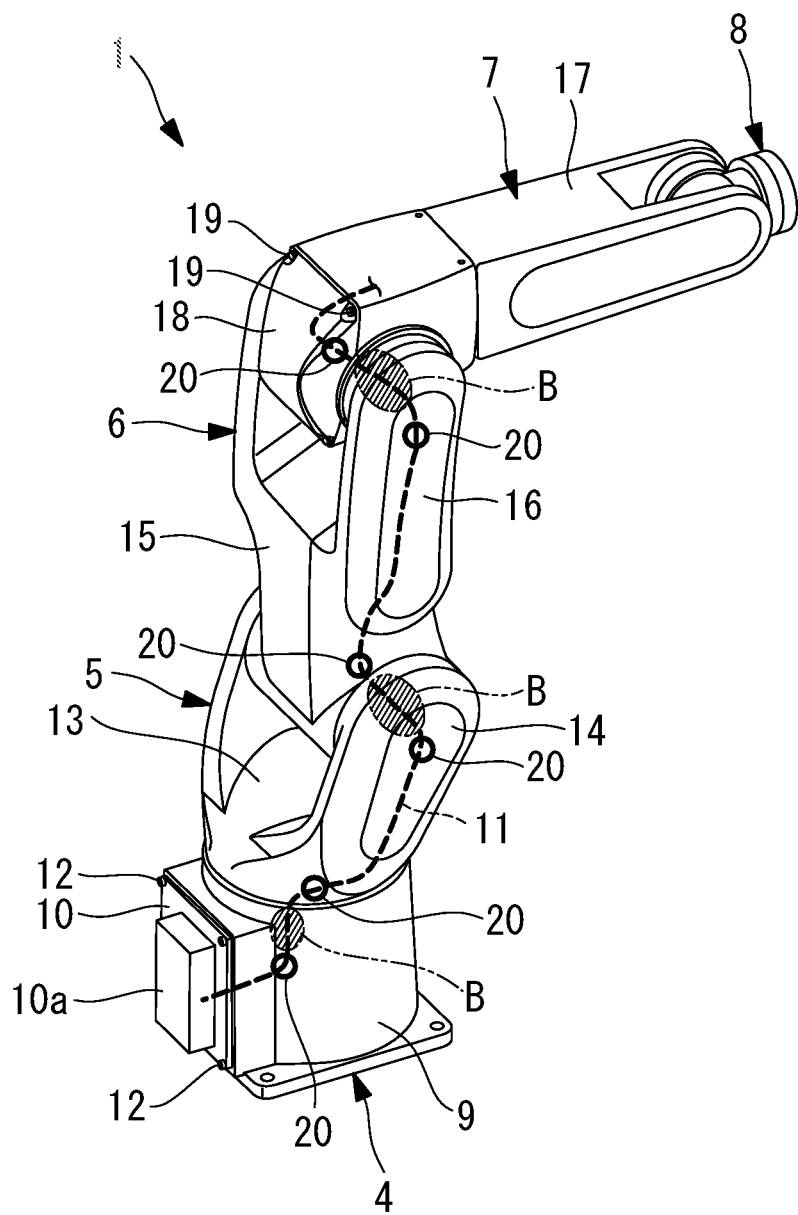
FIG. 2 is a perspective view for explaining the robot in which the wiring shown in FIG. 1 has not been additionally routed.

As shown in FIG. 2, the robot 1, in which the additional device 2 and cable 3 have not been attached and routed, is provided with: a base 4 that is installed on the floor; a turning torso 5 that is capable of rotating about a vertical first axis with respect to the base 4; a first arm 6 that is capable of rotating about a horizontal second axis with respect to the turning torso 5; a second arm 7 that is capable of rotating about a third axis parallel to the second axis, with respect to the first arm 6; and a 3-axis wrist unit 8 that is attached to a distal end of the second arm 7.

The base 4 is provided with: a base body (housing member) 9 that is hollow and that has an opening; and a wiring plate (cover member) 10 that blocks the opening of the base body 9. A connector 10a at the end of a cable (existing wiring) 11, to be described later, is fixed to the wiring plate 10. A section of the cable 11, which is fixed to the wiring plate 10, is accommodated in an internal space of the base body 9, the opening of which is blocked by the wiring plate 10. The wiring plate 10 is fixed to the base body 9 by means of bolts (fasteners) 12.

The turning torso 5 is provided with: a turning torso body (housing member) 13 that is hollow and that has an opening; and a cover member 14 that blocks the opening of the turning torso body 13. An internal space of the turning torso body 13 communicates with the internal space of the base body 9 via a communication space B. The cover member 14 is fixed to the turning torso body 13 by means of bolts (fasteners).

The first arm 6 is provided with: a first arm body (housing member) 15 that is hollow and that has an opening; and a cover member 16 that blocks the opening of the first arm body 15. An internal space of the first arm body 15 communicates with the internal space of the turning torso 5 via another communication space B. The cover member 16 is fixed to the first arm body 15 by means of bolts (fasteners).

The second arm 7 is provided with: a second arm body (housing member) 17 that is hollow and that has an opening; and a cover member 18 that blocks the opening of the second arm body 17. An internal space of the second arm body 17 communicates with the internal space of the first arm 6 via still another communication space B. The cover member 18 is fixed to the second arm body 17 by means of bolts (fasteners) 19.

For example, a motor (not shown) that rotationally drives the turning torso 5 with respect to the base 4 is accommodated in the internal space of the base body 9.

For example, a motor (not shown) that rotationally drives the first arm 6 with respect to the turning torso 5 and a motor (not shown) that rotationally drives the second arm 7 with respect to the first arm 6 are accommodated in the internal space of the first arm 6.

Furthermore, for example, a motor (not shown) that rotationally drives the wrist unit 8 with respect to the second arm 7 is accommodated in the internal space of the second arm 7.

The cable 11, which is connected to the respective motors, is routed in a route that starts from the connector 10a, which is fixed to the base body 9, that enters the internal space of the turning torso 5 via the internal space of the base body 9 and the corresponding communication space B, that enters the internal space of the first arm 6 via the corresponding communication space B, and that reaches the internal space of the second arm 7 via the corresponding communication space B.

Because sections of the cable 11 that pass through the respective communication spaces B are movable, the sections of the cable 11 are fixed, at both ends of each of the communication spaces B, to fixing metal fittings (fixing sites) 20 that are attached to the base body 9, the turning torso body 13, the first arm body 15, and the second arm body 17, by means of binding bands etc. While being routed from the wiring plate 10 to the second arm 7 via the predetermined route, the cable 11 is branched in the vicinities of the respective motors, and the branched sections thereof are connected to the respective motors.

Figure 3:
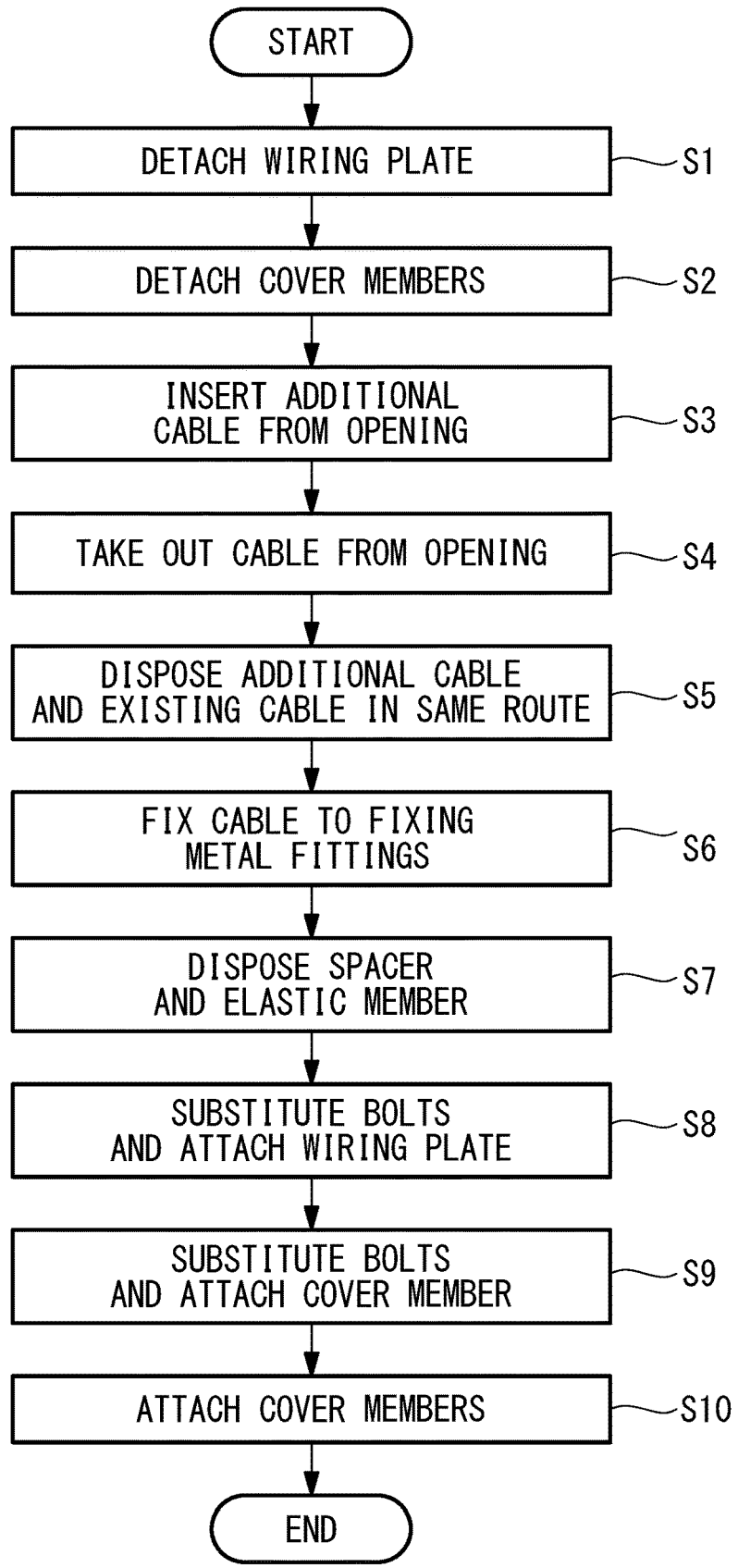
FIG. 3 is a flowchart for explaining the robot wiring additional routing method for the robot shown in FIG. 2.
Figure 4:
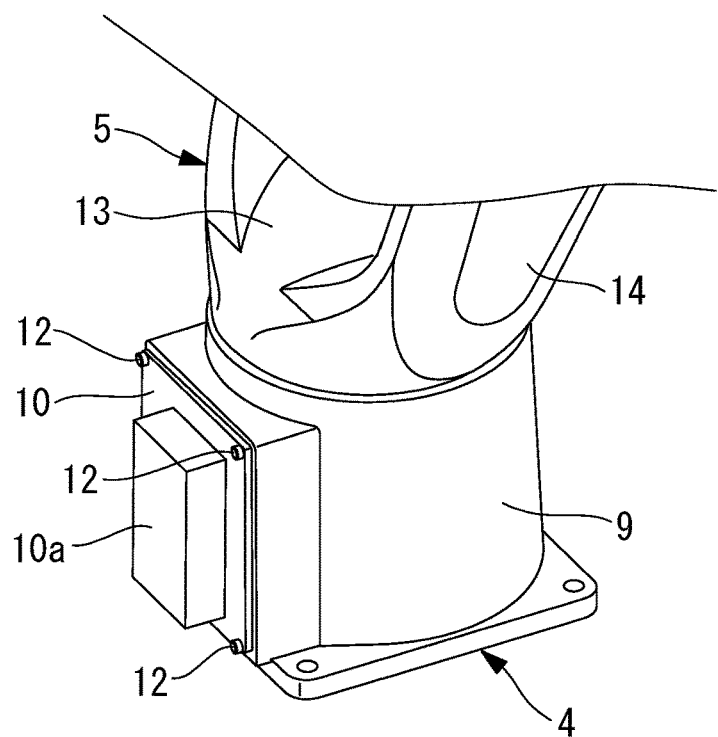
FIG. 4 is a partial perspective view showing a base body and a wiring plate of the robot shown in FIG. 2.
Figure 5:
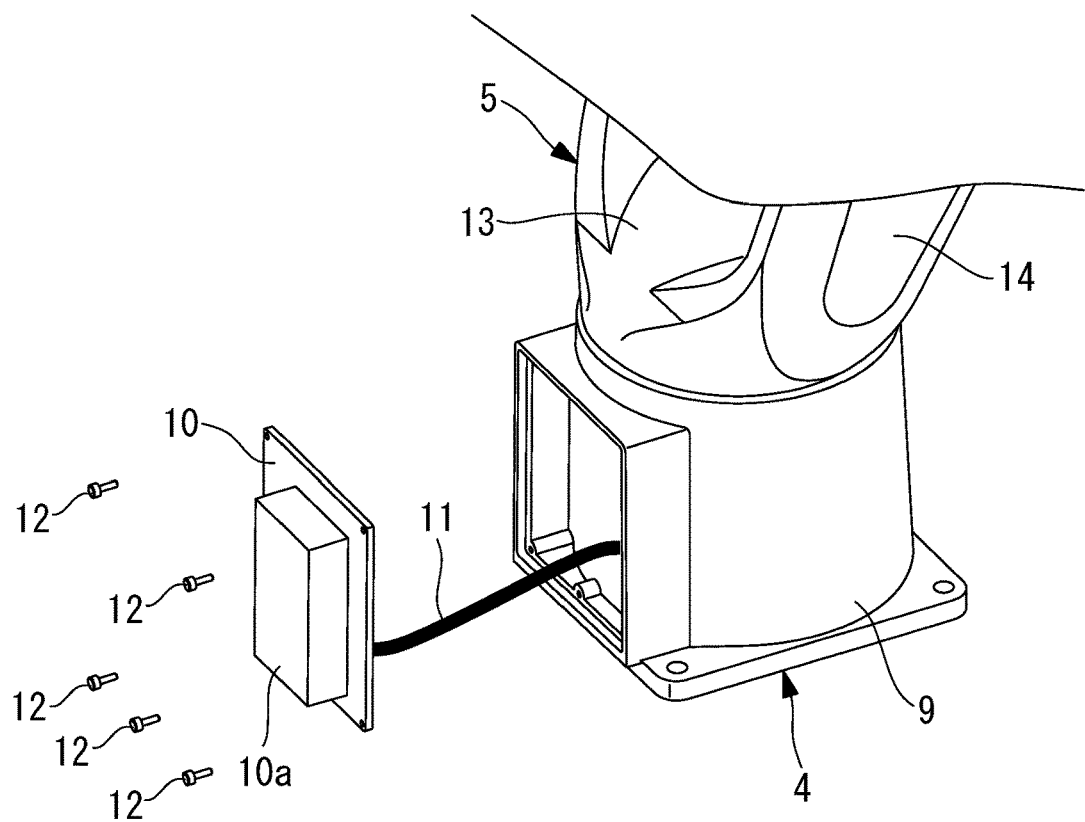
FIG. 5 is a partial perspective view showing a state in which the wiring plate of the robot shown in FIG. 4 is detached from the base body.
Figure 6:
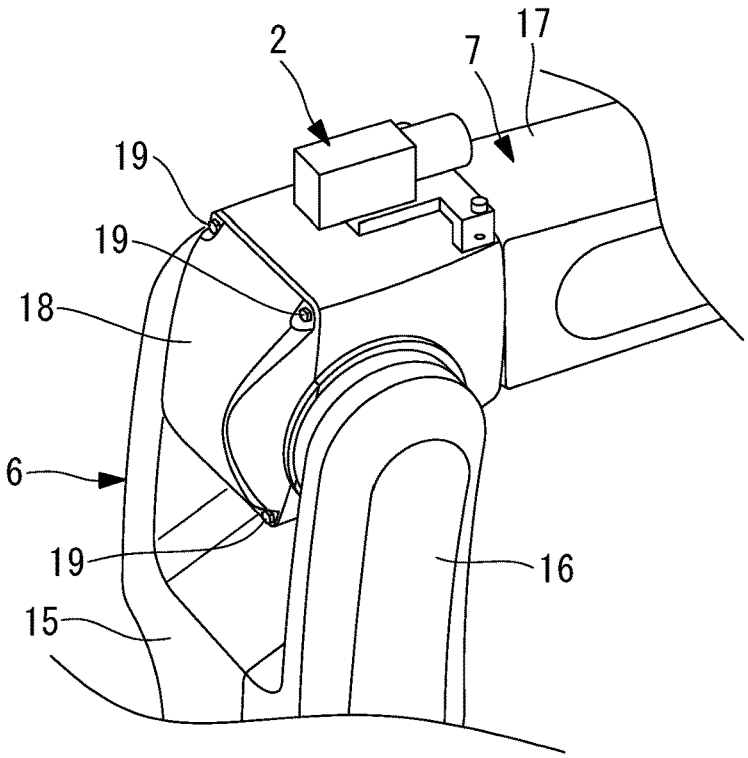
FIG. 6 is a partial perspective view showing a second arm body and a cover member of the robot shown in FIG. 2.
Figure 7:
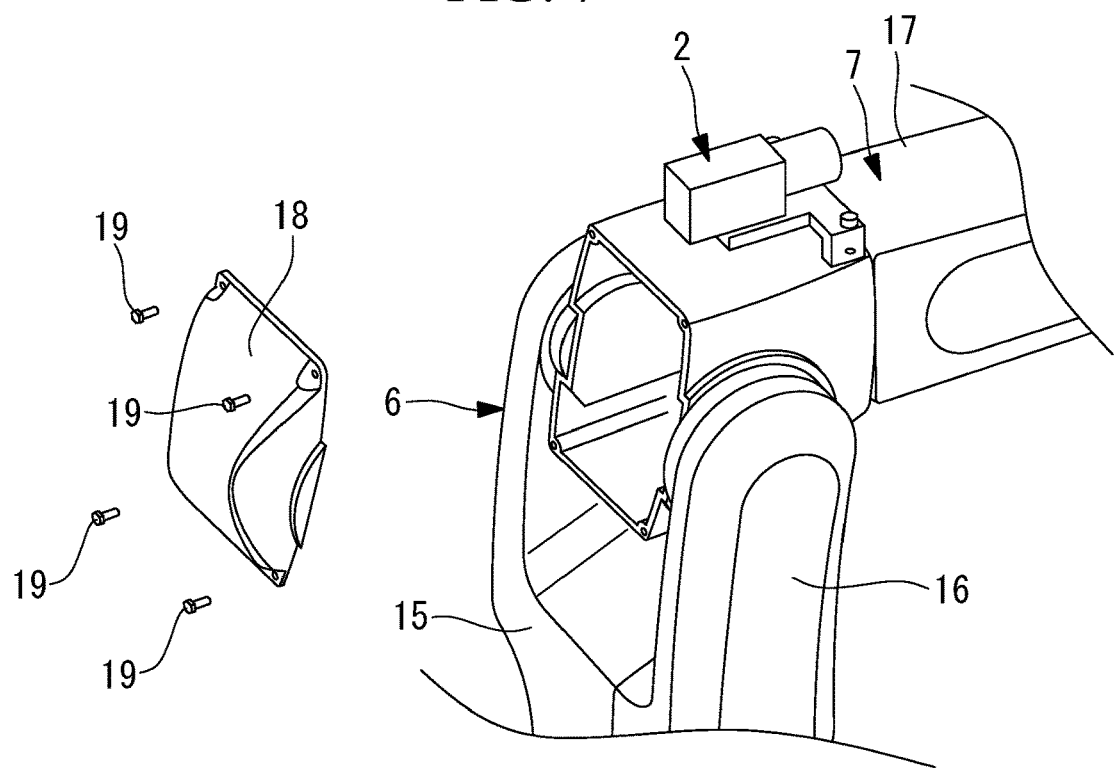
FIG. 7 is a partial perspective view showing a state in which the cover member of the robot shown in FIG. 6 is detached from the second arm body.

As shown in FIG. 3, in the robot wiring additional routing method for the robot 1 of this embodiment, first, the wiring plate 10 is detached from the base body 9 by loosening the bolts 12, as shown in FIGS. 4 and 5 (Step S1). As shown in FIGS. 6 and 7, the cover members 14, 16, and 18 are detached from the turning torso body 13, the first arm body 15, and the second arm body 17 by loosening the bolts 19 (Step S2). By detaching the wiring plate 10 and the respective cover members 14, 16, and 18, the internal spaces of the base body 9, the turning torso body 13, the first arm body 15, and the second arm body 17 are opened, thus making it possible to facilitate routing work for the additional cable 3.

Figure 8:
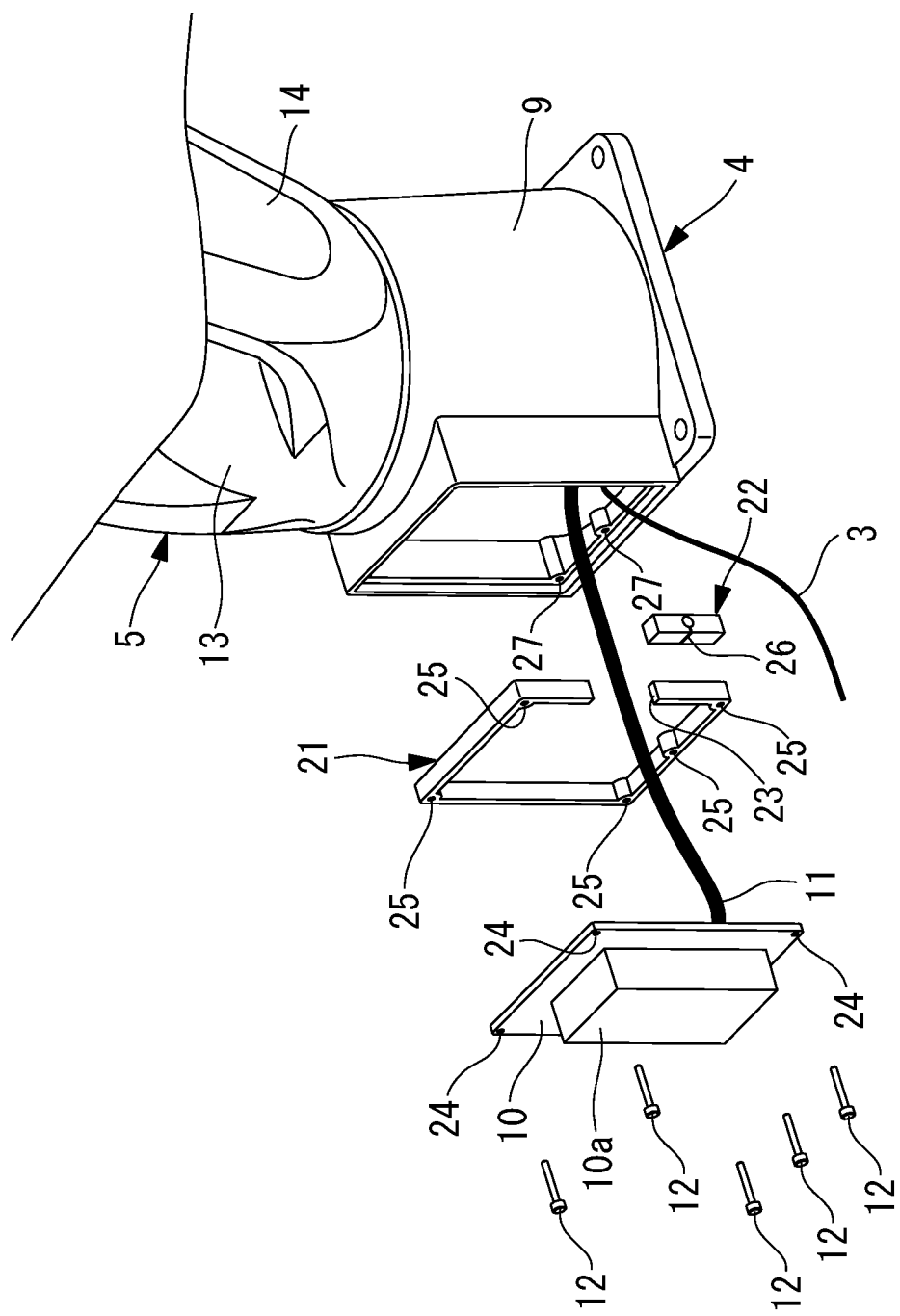
FIG. 8 is a partial perspective view showing a state in which a spacer is disposed between the wiring plate and the base body, which are shown in FIG. 5, and an additional cable is introduced.
Figure 9:
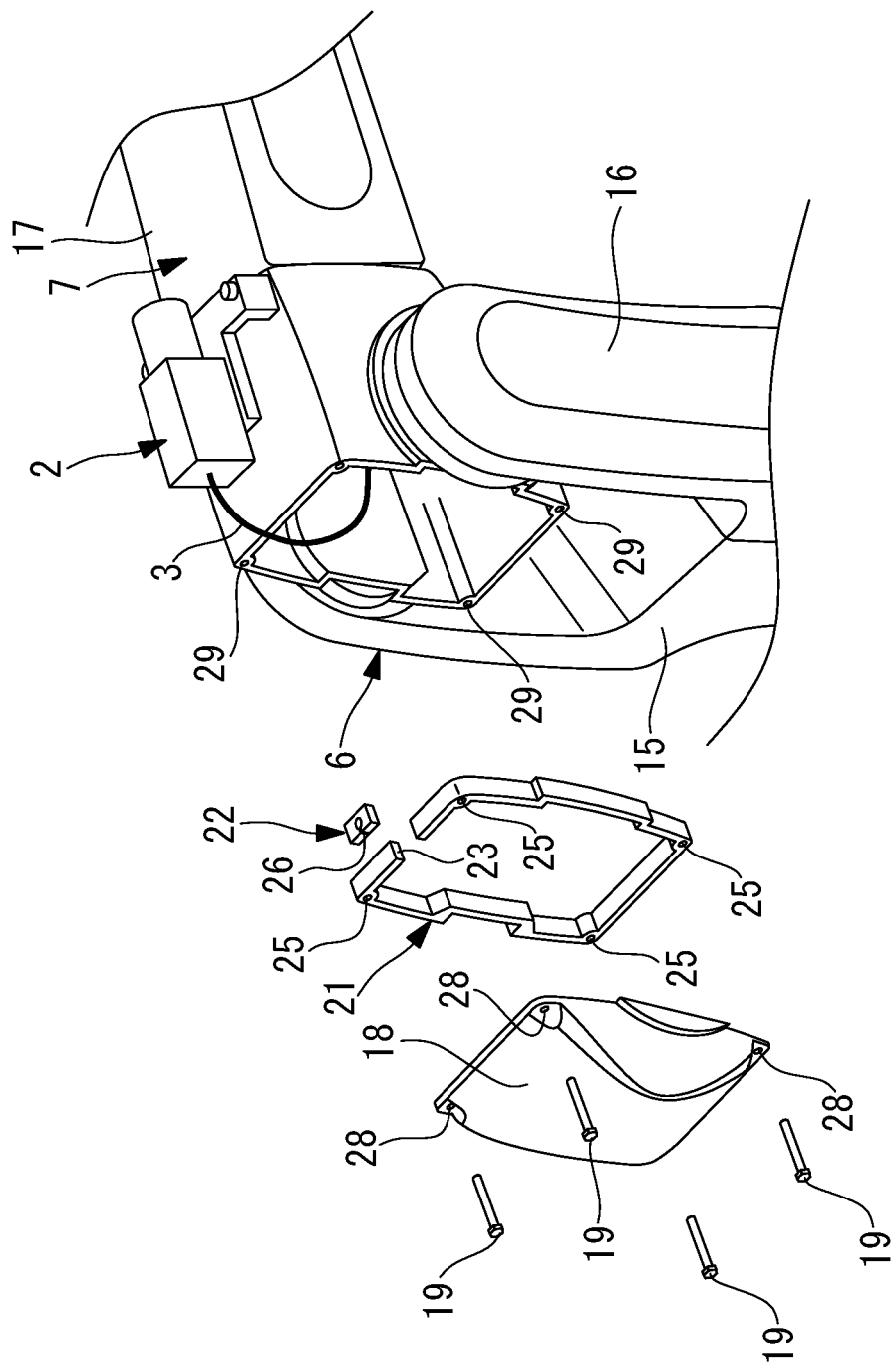
FIG. 9 is a partial perspective view showing a state in which a spacer is disposed between the cover member and the second arm body, which are shown in FIG. 7, and the additional cable is taken out and is connected to a camera.

Next, the additional cable 3 is inserted into the internal space of the base body 9 from the opening of the base body 9, which is opened by detaching the wiring plate 10, as shown in FIG. 8 (Step S3) and is pulled out to the internal space of the turning torso body 13 via the corresponding communication space B. The cable 3 pulled toward the turning torso body 13 is pulled out to the internal space of the first arm body 15 via the corresponding communication space B. Furthermore, the cable 3 pulled toward the first arm body 15 is pulled out to the internal space of the second arm body 17 via the corresponding communication space B. Then, the cable 3 pulled toward the second arm body 17 is pulled out to the outside from the opening of the second arm body 17 and is connected to the external device 2, as shown in FIG. 9 (Step S4).

Figure 1:
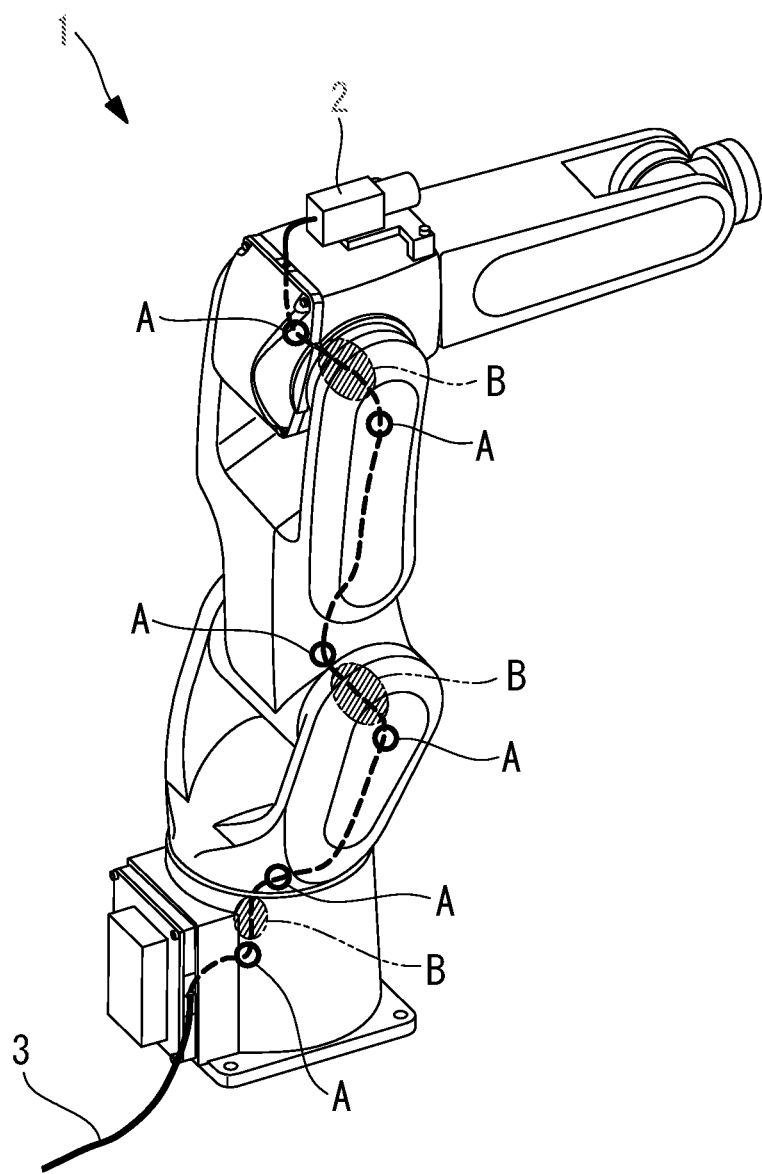
FIG. 1 is a perspective view of a robot, showing a state in which wiring is additionally routed by a robot wiring additional routing method according to one embodiment of the present invention.

The cable 3 disposed in the internal space of the robot 1 in this way is disposed along the same route as the existing cable 11 (Step S5) and is fixed parallel to the existing cable 11 by using the fixing metal fittings 20, which fix the existing cable 11 (Step S6). In FIG. 1, reference signs A indicate fixing sites. The cable 3 is fixed to the fixing metal fittings 20, which are disposed at both ends of each of the communication spaces B, at such positions of the cable 3 that the length of each of the corresponding sections of the cable 3 between the two fixing metal fittings 20 with the corresponding communication space B therebetween is longer than that of the existing cable 11.

Next, as shown in FIG. 8, a spacer 21 and an elastic member 22 are disposed between the wiring plate 10 and the base body 9 (Step S7). In this embodiment, the spacer 21 is a rectangular frame-like member having a fixed thickness size and having substantially the same external form as the external form of the wiring plate 10, and is formed to be substantially C-shaped in transverse cross-section due to a notch 23 that is formed by cutting out a circumferential part of the spacer 21. The spacer 21 is provided with through-holes 25 penetrating therethrough in the thickness direction, at positions corresponding to through-holes 24 that are provided in the wiring plate 10 and through which the bolts 12 are made to pass.

As shown in FIG. 8, the notch 23 has a larger width size than the thickness of the existing cable 11, which is connected to the wiring plate 10. The elastic member 22 is formed of a rectangular-parallelepiped-shaped sponge rubber that can be disposed in the notch 23 by being made to contract. The elastic member 22 is provided with a slit 26 that is cut into the center from one side thereof. Accordingly, an intermediate position of the additional cable 3 in the length direction is inserted into the slit 26, thereby making it possible to dispose the elastic member 22 so as to surround the circumference of the cable 3 at this position. The size of one side of the elastic member 22 is formed to be substantially the same as the width of the notch 23, and the size of another one side thereof is formed to be larger than the thickness size of the spacer 21.

Figure 10:
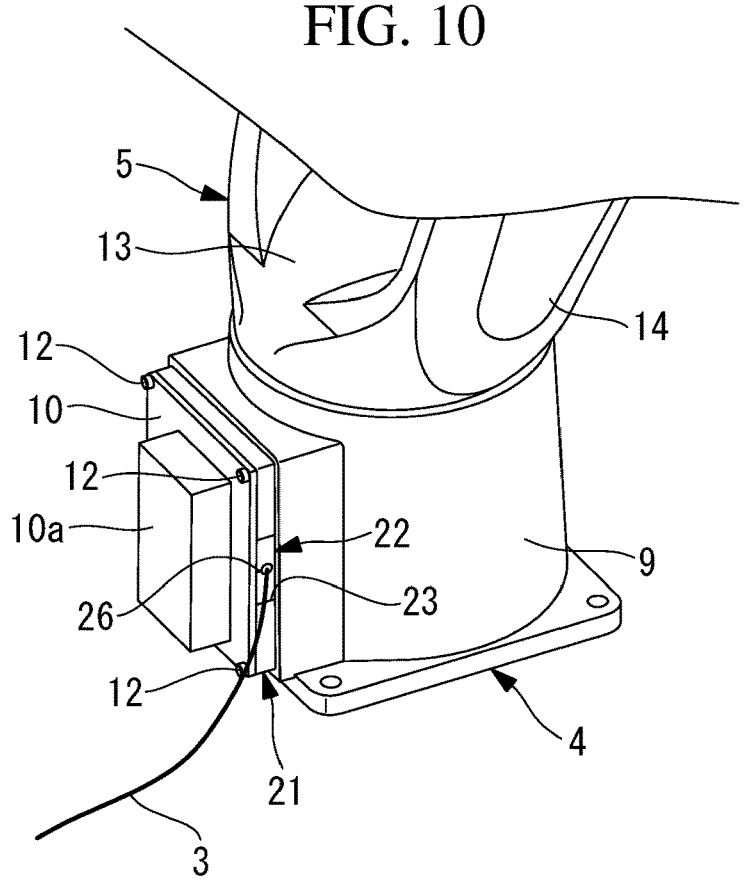
FIG. 10 is a partial perspective view showing a state in which the spacer is sandwiched between the wiring plate and the base body, which are shown in FIG. 8, and the wiring plate is fixed to the base body.

Then, as shown in FIG. 8, the bolts 12 that fix the wiring plate 10 to the base body 9 are substituted by bolts 12 that are longer by the thickness of the spacer 21, and the substitute long bolts 12 are made to penetrate through the through-holes 24 and 25 of the wiring plate 10 and the spacer 21 and are fastened into screw holes 27 in the base body 9 (Step S8). At this time, as shown in FIG. 10, the elastic member 22 that has been attached to the cable 3 is disposed at such a position as to fill the notch 23 of the spacer 21. Accordingly, when the wiring plate 10 and the base body 9 are fastened to each other with the spacer 21 sandwiched therebetween, the cable 3 passes through the notch position of the spacer 21 and is disposed so as to be routed across the inside and outside of the base body 9, and the elastic member 22 is compressed between the wiring plate 10 and the base body 9, thus fixing the cable 3 at this position.

Figure 11:
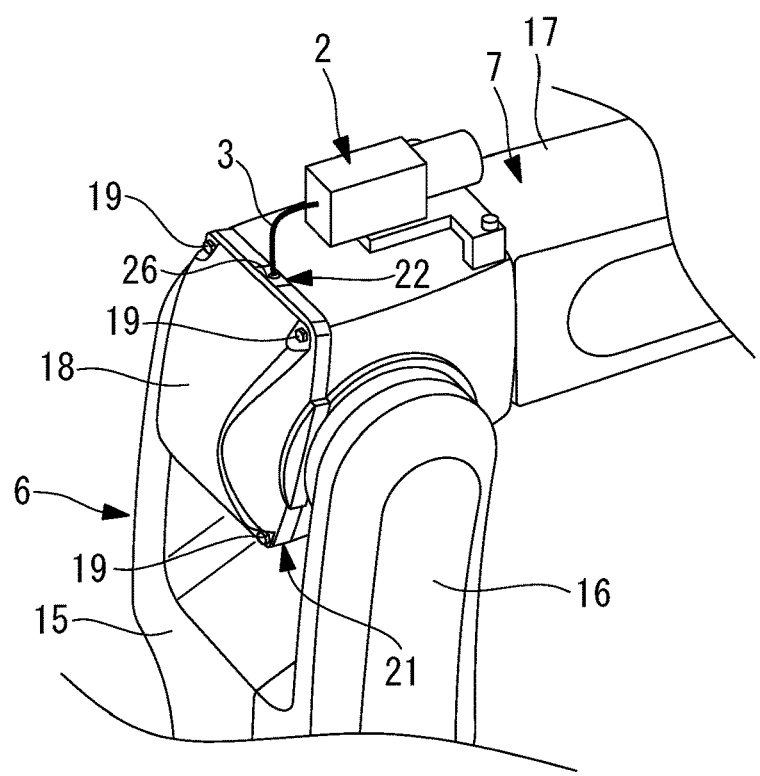
FIG. 11 is a partial perspective view showing a state in which the spacer is sandwiched between the cover member and the second arm body, which are shown in FIG. 9, and the cover member is fixed to the second arm body.

In the same way, as shown in FIG. 9, another spacer 21 that has a notch 23 and another elastic member 22 that has a slit 26 are prepared also for the opening of the second arm body 17, and, as shown in FIG. 11, the elastic member 22 is attached to the cable 3 and is disposed at such a position as to fill the notch 23, and substitute long bolts 19 are made to penetrate through the through-holes 28 and 25 of the cover member 18 and the spacer 21 and are fastened into screw holes 29 in the second arm body 17, thereby fixing the cable 3 (Step S9). Accordingly, when the cover member 18 and the second arm body 17 are fastened to each other with the spacer 21 sandwiched therebetween, the cable 3 passes through the notch position of the spacer 21 and is disposed so as to be routed across the inside and outside of the second arm body 17, and the elastic member 22 is compressed between the cover member 18 and the second arm body 17, thus fixing the cable 3 at this position.

Thereafter, the other cover members 14 and 16 are also attached to the turning torso body 13 and the first arm body 15 by means of bolts, thus blocking the openings thereof (Step S10).

Accordingly, routing work for the additional cable 3 to the robot 1 is completed.

In this way, according to the robot wiring additional routing method for the robot 1 of this embodiment, by simply detaching the wiring plate 10 from the base body 9, inserting the spacer 21 therebetween, and re-attaching the wiring plate 10 to the base body 9 with the long bolts 12, it is possible to introduce the additional cable 3 into the internal space of the robot 1 via a gap formed between the wiring plate 10 and the base body 9. In this case, by using the spacer 21 that is C-shaped and that has the notch 23, it is possible to dispose the spacer 21 between the wiring plate 10 and the base body 9 without detaching the cable 11, which is fixed to the wiring plate 10, from the wiring plate 10.

Then, in this case, by surrounding the cable 3 with the elastic member 22 at such a position as to penetrate through the notch 23 of the spacer 21, there is an advantage in that it is possible to prevent the cable 3 from being brought into contact with edge sections etc. of the wiring plate 10 and the base body 9 and to easily fix the cable 3 at this position by compressing the elastic member 22.

Because the additional cable 3 is routed in the same route as the existing cable 11 by using the fixing metal fittings 20, which fix the existing cable 11, it is possible to prevent a large load from being imposed on the additional cable 3 when the robot 1 is operated.

In particular, because a section of the additional cable 3 disposed in a region where the sections of the cables are movable is attached to the fixing metal fittings 20, which are located at both ends of the region, at such positions of the cable 3 that the length of the section of the additional cable 3 is longer than that of the existing cable 11, there is an advantage in that the load imposed on the additional cable 3 through the operation of the robot 1 can be reliably reduced, compared with the load imposed on the existing cable 11.

Then, by simply detaching the cover member 18 from the second arm body 17, inserting the spacer 21 therebetween, and re-attaching the cover member 18 to the second arm body 17 with the long bolts 19, the additional cable 3 can be taken out from the internal space of the robot 1 to the outside via a gap formed between the cover member 18 and the second arm body 17.

In this case, by surrounding the cable 3 with the elastic member 22 at such a position as to penetrate through the notch 23 of the spacer 21, there is also an advantage in that it is possible to prevent the cable 3 from being brought into contact with the cover member 18 and the second arm body 17 and to easily fix the cable 3 at this position by compressing the elastic member 22.

Then, according to the robot wiring additional routing method for the robot 1 of this embodiment, there is an advantage in that it is possible to route the additional cable 3 by simply adding the spacers 21 and the elastic members 22 and substituting the bolts 12, 19 with the long bolts 12, 19, and to route the additional cable 3 inside the mechanism of the robot 1, without performing additional machining on the original component parts of the robot 1.

Note that, in this embodiment, although a camera is shown as an example of the external device 2, the external device is not limited thereto. Although the cable 3 is shown as example wiring to be additionally routed, the present invention may be applied to a case in which arbitrary wiring, such as a hose, is routed.

Although a description has been given of a case in which the cable 3 is introduced into the internal space of the base body 9 from between the base body 9 and the wiring plate 10, and the cable 3 in the internal space of the second arm body 17 is taken out to the outside from between the second arm body 17 and the cover member 18, instead of this, it is also possible to adopt other positions where the cable 3 is introduced and is taken out.

Although a description has been given of a case in which the wiring 3 to be connected to the external device 2 is routed, instead of this, for example, the present invention may also be applied to additional routing of the wiring 3 to a device to be installed in the internal space of the second arm body 17.

In this case, the spacer 21 may be installed at one place where the cable 3 is introduced from the outside.

Although a rectangular-parallelepiped-shaped block-like sponge rubber is shown as an example of the elastic member 22, instead of this, it is also possible to adopt another arbitrary form, for example, a tape-like elastic member or the like to be wound around the cable 3. The elastic member 22 can have an arbitrary form as long as the elastic member 22 can fix the cable 3 by being sandwiched and compressed between the cover member 10, 14, 16, 18 and the housing member 9, 13, 15, 17.

It is also possible to dispose, between the spacer 21 and the wiring plate 10 and between the spacer 21 and the base body 9, seal members or seal paints for sealing gaps therebetween. Similarly, it is also possible to dispose, between the spacer 21 and the cover member 18 and between the spacer 21 and the second arm body 17, seal members or seal paints for sealing gaps therebetween.

Although a single-body spacer that has a rectangular frame-like shape and that is provided with the notch 23, which is obtained by cutting off a circumferential part thereof, thus having a C-shaped form as a whole, is adopted as the spacer 21, instead of this, a spacer having two separate bodies may be adopted. Although a description has been given of a case in which the gap between the cover member 10, 14, 16, 18 and the housing member 9, 13, 15, 17 is sealed over the entire circumference by means of the spacer 21 and the elastic member 22, if the sealing performance is not required, it is also possible to adopt, as the spacer 21, tubular members to be partially disposed only at the positions of the bolts 12, 19.

Although the spacer 21 that is C-shaped in which a circumferential part thereof is cut off is shown as an example, it is also possible to adopt a closed ring-like spacer 21 and to provide therein a notch that is formed of a recess for forming a gap in a surface to be in close contact with the cover member 10, 14, 16, 18 or the housing member 9, 13, 15, 17.

Figure 12:
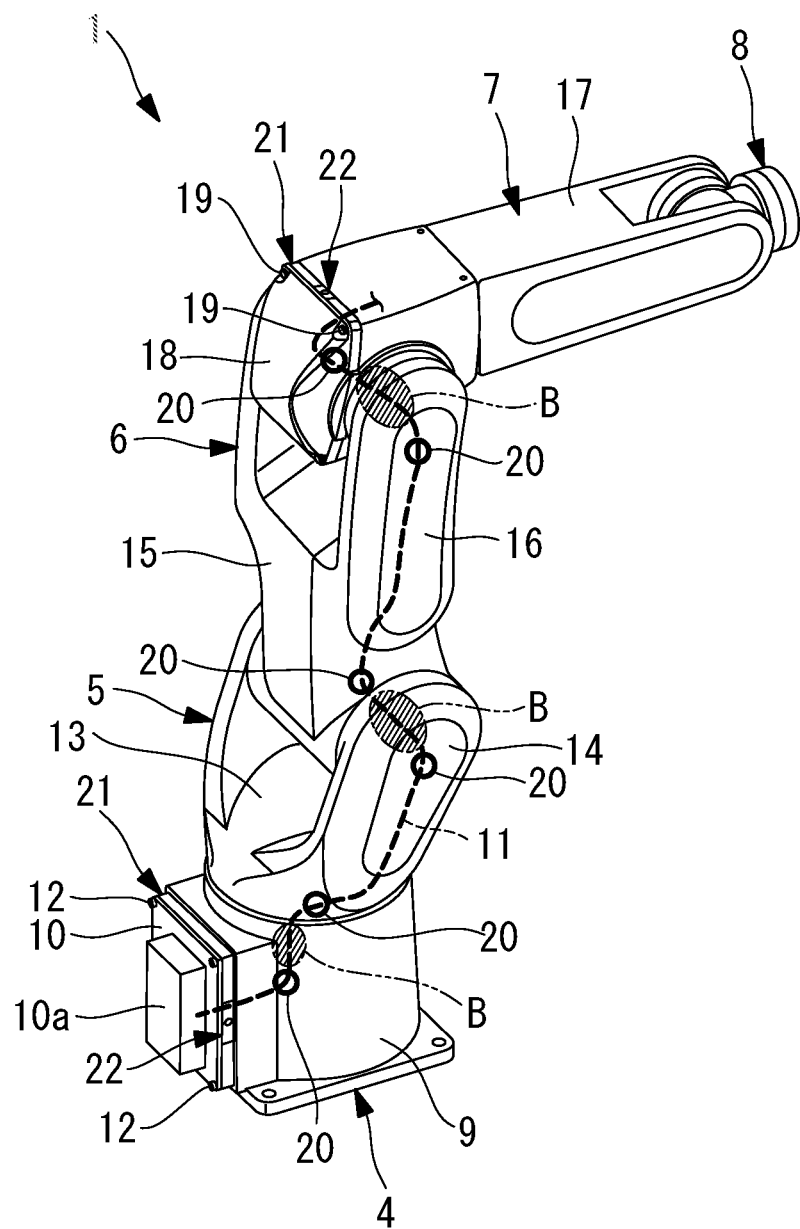
FIG. 12 is a perspective view showing the robot according to the one embodiment of the present invention.

As shown in FIG. 12, the robot 1 according to the one embodiment of the present invention may be provided with the spacers 21 and the elastic members 22 in advance at the positions where the additional cable 3 is introduced and is taken out. According to this configuration, the bolts 12, 19 are loosened to detach the spacers 21 together with the cover member 18 and the wiring plate 10 when the external device 2 is attached, and they are attached to the original positions after the additional cable 3 is routed, thereby making it possible to perform additional routing of the additional cable 3, without adding or substituting parts.

Note that, in this case, the spacer 21 and the elastic member 22 may be provided at one place.

In this embodiment, although a description has been given of an example case in which the additional cable 3 is disposed in the same route as the existing cable 11, the additional cable 3 and the existing cable 11 need not be disposed in the same route and may be disposed in different routes.

As a result, the following aspect is read from the above described embodiment of the present invention.

According to one aspect, the present invention provides a robot wiring additional routing method in which additional wiring is additionally routed for a robot that is provided with: a plurality of housing members that are coupled so as to be relatively movable; a cover member that is detachably attached to at least one of the housing members by means of fasteners; and existing wiring that is routed via a communication space communicating with internal spaces of the housing members, the method including: detaching some of the fasteners to detach the cover member from the corresponding housing member, thus forming a gap between the detached cover member and the housing member; disposing the additional wiring at such a position as to be routed across an inside and an outside of the housing member, via the formed gap; and attaching the detached cover member to the housing member by means of the detached fasteners or other fasteners, in a state in which a spacer that maintains the gap is sandwiched between the cover member and the housing member.

According to this aspect, some of the fasteners that attach the cover member to the housing member are detached, thereby detaching the cover member from the housing member and forming a gap between the detached cover member and the housing member. Accordingly, it is possible to insert the additional wiring into the housing member from the outside of the robot.

The wiring is disposed at such a position as to be routed across the inside and outside of the housing member, via the formed gap, and a section of the additional wiring that is disposed inside the housing member is routed to a desired position at the distal end of the robot, via a route in which the wiring is not subjected to a large load even through the operation of the robot.

Thereafter, the spacer is interposed between the detached cover member and the housing member, thereby making it possible to re-attach the cover member to the housing member while maintaining the gap through which the additional wiring is made to pass. Specifically, according to this aspect, the additional wiring, to be additionally attached, can be routed in the mechanism of the robot, without performing additional machining on the original component parts of the robot.

The above-described aspect may further include: disposing an elastic member that surrounds an outer circumference of the additional wiring at the position of the gap; and fixing the additional wiring at the position of the gap by sandwiching and elastically deforming the elastic member between the cover member and the housing member, when the detached cover member is attached to the housing member.

With this configuration, the wiring, which is disposed at such a position as to be routed across the inside and outside of the housing member via the gap formed between the cover member and the housing member, is fixed between the cover member and the housing member due to elastic deformation of the elastic member, which is disposed at such a position as to surround the wiring. Accordingly, it is possible to prevent wear of the wiring caused by direct contact between the wiring and edge sections etc. of the cover member and the housing member.

In the above-described aspect, the fasteners may be bolts; and the other fasteners may be bolts longer than the detached fasteners.

With this configuration, when the spacer is sandwiched between the cover member and the housing member, and the cover member is re-attached to the housing member, the bolts, which are the fasteners, are simply substituted by the long bolts, which are longer by the thickness of the spacer, thereby making it possible to easily attach the cover member to the housing member.

In the above-described aspect, the additional wiring may be disposed along the same route as the existing wiring.

In the above-described aspect, the additional wiring may be fixed so as to be adjacent to and parallel to the existing wiring, at fixing sites where the existing wiring is fixed to the respective housing members.

With this configuration, the additional wiring, to be additionally attached, can be easily disposed in the same route as the existing wiring.

In the above-described aspect, the additional wiring may be fixed to two of the fixing sites that are both ends of a movable section of the existing wiring, so as to have a length equal to or longer than the maximum length of the existing wiring between the fixing sites. In a movable section of the existing wiring, the length of the corresponding section of each wiring disposed between the two fixing sites, which are located at both ends of the movable section, is set to a length including an extra length such that an excessive load is not imposed on the wiring through the operation of the robot.

With this configuration, it is possible to reduce the load on the additional wiring, which is disposed parallel to the existing wiring, to the load on the existing wiring or less, and to improve the durability of the thus-added additional wiring.

In the above-described aspect, the spacer may be formed into a flat plate shape to be sandwiched between the housing member and the cover member and may be provided with a notch that forms, between the housing member and the cover member, the gap through which the additional wiring can be made to pass in a state in which the spacer is sandwiched between the housing member and the cover member.

With this configuration, when the flat-plate-shaped spacer is sandwiched between the housing member and the cover member, the notch provided in the spacer easily forms the gap, which has a maximum size corresponding to the thickness of the spacer.

In the above-described aspect, the cover member may be a wiring plate through which the existing wiring penetrates; the spacer may be formed into a C-shape in which a circumferential part thereof is cut off, with the notch; and the notch may have such a space size as to allow the existing wiring to pass therethrough.

With this configuration, in a state in which the cover member, which forms the wiring plate, is detached from the housing member, a section of the existing wiring disposed between the cover member and the housing member is inserted into the inside of the spacer via the notch, thereby making it possible to dispose the spacer between the cover member and the housing member, without detaching the existing wiring from the cover member.

According to another aspect, the present invention provides a robot including: a plurality of housing members that are coupled so as to be relatively movable; a cover member that is detachably attached to at least one of the housing members by means of fasteners; existing wiring that is routed via a communication space communicating with internal spaces of the housing members; and a spacer that forms a gap that allows, in a state in which the spacer is sandwiched between the at least one housing member and the cover member, additional wiring to be disposed between the housing member and the cover member.

According to this aspect, in a state in which the gap between the cover member and the housing member is expanded by loosening the fasteners and detaching the cover member from the housing member, the additional wiring is disposed inside and outside the housing via the expanded gap, and the cover member and the housing member, with the spacer sandwiched therebetween, are again fastened by means of the fasteners, thereby making it possible to easily route the additional wiring, to be additionally attached, inside the housing member.

In the above-described aspect, the spacer may be disposed between each of two different housing members of the plurality of housing members and the cover member.

With this configuration, the additional wiring is introduced into one of the housing members via the gap between the housing member and the cover member, and the introduced additional wiring is taken out to the outside of the other housing member located closer to the distal end of the robot, via the gap between the other housing member and the corresponding cover member, thus making it possible to route the additional wiring to an additional device that is fixed to the outside of the robot.

REFERENCE SIGNS LIST 1 robot
3 cable (additional wiring)
9 base body (housing member)
10 wiring plate (cover member)
11 cable (existing wiring)
12, 19 bolt (fastener)
13 turning torso body (housing member)
14, 16, 18 cover member
15 first arm body (housing member)
17 second arm body (housing member)
20 fixing metal fitting (fixing site)
21 spacer
22 elastic member
23 notch
B communication space

The invention claimed is:

1. A robot wiring additional routing method in which additional wiring is additionally routed for a robot that is provided with a plurality of housing members that are coupled so as to be relatively movable; a cover member that is detachably attached to at least one of the housing members by means of fasteners; and existing wiring that is routed via a communication space communicating with internal spaces of the housing members, the method comprising:
    detaching some of the fasteners to detach the cover member from the corresponding housing member, thus forming a gap between the detached cover member and the housing member;
    disposing the additional wiring at such a position as to be routed across an inside and an outside of the housing member, via the formed gap; and
    attaching the detached cover member to the housing member, with a spacer provided between the cover member and the housing member and having a notch disposed therein, with the detached fasteners or other fasteners, in a state in which the cover member and the housing member are separated from each other by a thickness of the spacer by sandwiching the spacer that maintains the gap between the cover member and the housing member, wherein the notch forms a channel through which the additional wiring passes.

2. The robot wiring additional routing method according to claim 1, further comprising:
- disposing an elastic member that surrounds an outer circumference of the additional wiring at the position of the gap; and
- fixing the additional wiring at the position of the gap by sandwiching and elastically deforming the elastic member between the cover member and the housing member, when the detached cover member is attached to the housing member.

3. The robot wiring additional routing method according to claim 1,
- wherein the fasteners are bolts; and
- the other fasteners are bolts longer than the detached fasteners.

4. The robot wiring additional routing method according to claim 1, wherein the additional wiring is disposed along the same route as the existing wiring.

5. The robot wiring additional routing method according to claim 1, wherein the additional wiring is fixed so as to be adjacent to and parallel to the existing wiring, at fixing sites where the existing wiring is fixed to the respective housing members.

6. The robot wiring additional routing method according to claim 5, wherein the additional wiring is fixed to two of the fixing sites that are both ends of a movable section of the existing wiring, so as to have a length equal to or longer than the maximum length of the existing wiring between the fixing sites.

7. The robot wiring additional routing method according to claim 1, wherein the spacer is formed into a flat plate shape to be sandwiched between the housing member and the cover member.

8. The robot wiring additional routing method according to claim 7,
- wherein the cover member is a wiring plate through which the existing wiring penetrates;
- the spacer is formed into a C-shape in which a circumferential part thereof is cut off, with the notch; and
- the notch has such a space size as to allow the existing wiring to pass therethrough.

9. A robot comprising:
- a plurality of housing members that are coupled so as to be relatively movable;
- a cover member that is detachably attached to at least one of the housing members by means of fasteners;
- existing wiring that is routed on a first path via a communication space communicating with internal spaces of the housing members; and
- a spacer that forms a gap between the housing member and the cover member by sandwiching the spacer between the housing member and the cover member, wherein the cover member is separated from the housing member by loosening the fasteners, the robot further comprising additional wiring disposed between the housing member and the cover member and extending through the gap along a second path different from the first path,
- wherein the cover member is sized to fully blocks an opening of the housing member if directly attached to the housing member.

10. The robot according to claim 9, wherein the spacer is disposed between each of two different housing members of the plurality of housing members and the cover member.

* * * * *